(12) United States Patent
Burbaum et al.

(10) Patent No.: US 10,286,490 B2
(45) Date of Patent: May 14, 2019

(54) OSCILLATING WELDING METHOD

(71) Applicant: SIEMENS AKTIENGESELLSCHAFT, München (DE)

(72) Inventors: Bernd Burbaum, Falkensee (DE); Torsten Jokisch, Neuenhagen Bei Berlin (DE); Michael Ott, Mülheim am der Ruhr (DE)

(73) Assignee: SIEMENS AKTIENGESELLSCHAFT (DE)

( * ) Notice: Subject to any disclaimer, the term of this patent is extended or adjusted under 35 U.S.C. 154(b) by 172 days.

(21) Appl. No.: 15/110,773

(22) PCT Filed: Feb. 21, 2014

(86) PCT No.: PCT/EP2014/053389
§ 371 (c)(1),
(2) Date: Jul. 11, 2016

(87) PCT Pub. No.: WO2015/106833
PCT Pub. Date: Jul. 23, 2015

(65) Prior Publication Data
US 2016/0318124 A1    Nov. 3, 2016

(30) Foreign Application Priority Data

Jan. 17, 2014  (DE) .................. 10 2014 200 834

(51) Int. Cl.
*B23K 26/144*    (2014.01)
*B23K 26/342*    (2014.01)
(Continued)

(52) U.S. Cl.
CPC .......... *B23K 26/1438* (2015.10); *B23K 10/02* (2013.01); *B23K 15/002* (2013.01);
(Continued)

(58) Field of Classification Search
CPC ...... B23K 10/02; B23K 15/002; B23K 26/08; B23K 26/082; B23K 26/1438; B23K 26/342; B32K 26/1444
See application file for complete search history.

(56) References Cited

U.S. PATENT DOCUMENTS 4,562,332 A * 12/1985 Walter ............... B23K 15/0086
219/121.66
4,814,575 A *  3/1989 Petitbon .................. B05B 7/228
219/121.64
(Continued)

FOREIGN PATENT DOCUMENTS

CN    101052495 A    10/2007
CN    102112266 A    6/2011
(Continued)

OTHER PUBLICATIONS

Machine translation of Japan Patent document No. 2005-088,078, Mar. 2018.*
(Continued)

*Primary Examiner* — Geoffrey S Evans
(74) *Attorney, Agent, or Firm* — Schmeiser, Olsen & Watts LLP

(57) ABSTRACT

A method is provided for welding a substrate, in which an energy source and/or a material feed is or are moved in an oscillating motion over the surface of the substrate. The oscillating movement in a vertical and/or horizontal direction during welding results in smaller grains, which prevent the formation of fractures during welding.

14 Claims, 1 Drawing Sheet

(51) Int. Cl.

| | | |
|---|---|---|
| *B23K 26/14* | (2014.01) | |
| *B23K 26/06* | (2014.01) | |
| *B23K 26/08* | (2014.01) | |
| *B23K 35/02* | (2006.01) | |
| *B23K 26/082* | (2014.01) | |
| *B23K 10/02* | (2006.01) | |
| *B23K 15/00* | (2006.01) | |
| *F01D 5/12* | (2006.01) | |
| *F01D 9/02* | (2006.01) | |
| *B23K 101/00* | (2006.01) | |
| *B23K 103/08* | (2006.01) | |
| *F01D 5/00* | (2006.01) | |

(52) U.S. Cl.
CPC .............. *B23K 26/06* (2013.01); *B23K 26/08* (2013.01); *B23K 26/082* (2015.10); *B23K 26/14* (2013.01); *B23K 26/144* (2015.10); *B23K 26/342* (2015.10); *B23K 35/0244* (2013.01); *F01D 5/12* (2013.01); *F01D 9/02* (2013.01); *B23K 2101/001* (2018.08); *B23K 2103/08* (2018.08); *F01D 5/005* (2013.01); *F05D 2220/30* (2013.01); *F05D 2230/233* (2013.01); *F05D 2230/30* (2013.01); *F05D 2230/31* (2013.01); *F05D 2300/175* (2013.01)

(56) References Cited

U.S. PATENT DOCUMENTS

| | | | | |
|---|---|---|---|---|
| 4,832,981 | A | 5/1989 | Yamazaki | |
| 4,832,982 | A | 5/1989 | Mori et al. | |
| 6,054,192 | A | 4/2000 | Otsuka et al. | |
| 2006/0255019 | A1* | 11/2006 | Martukanitz | B23K 26/0648 219/121.64 |
| 2011/0073636 | A1 | 3/2011 | Arjakine et al. | |
| 2011/0089150 | A1* | 4/2011 | Arjakine | B23K 26/32 219/121.64 |
| 2011/0248001 | A1* | 10/2011 | Kawanaka | C30B 11/00 219/76.1 |
| 2012/0267347 | A1* | 10/2012 | Arjakine | B05B 7/228 219/121.64 |
| 2013/0216836 | A1* | 8/2013 | Grebe | B22F 3/1055 264/497 |
| 2013/0232749 | A1* | 9/2013 | Bruck | B23K 9/042 29/402.01 |
| 2014/0197139 | A1* | 7/2014 | Burbaum | B23K 26/34 219/76.12 |
| 2014/0291304 | A1* | 10/2014 | Mudd, II | B23K 26/32 219/121.61 |
| 2015/0298258 | A1* | 10/2015 | Arjakine | B05B 7/228 219/76.1 |
| 2016/0288263 | A1* | 10/2016 | Arjakine | B23K 26/34 |

FOREIGN PATENT DOCUMENTS

| | | |
|---|---|---|
| DE | 10217200 A1 | 10/2003 |
| EP | 0856393 A2 | 8/1998 |
| EP | 2311597 A1 | 4/2011 |
| JP | 2005-088078 A * | 4/2005 |
| JP | 2007-296580 A * | 11/2007 |
| JP | 2008194730 A | 8/2008 |
| KR | 20050023271 A | 3/2005 |
| WO | 2006116722 A2 | 11/2006 |
| WO | WO2006116722 A2 | 11/2006 |
| WO | 2009143909 A1 | 12/2009 |
| WO | WO2009143909 A1 | 12/2009 |

OTHER PUBLICATIONS

Machine translation of Japan Patent document No. 2007-296,580, Mar. 2018.*
Korean Office Action for Korean Application No. 10-2016-7018857, dated Jan. 3, 2018.
English Translation of Chinese Office Action for CN Application No. 201480073421.5, dated Jan. 17, 2017.
Application No. PCT/EP2014/053389, International Search Report dated Nov. 20, 2014.
Application No. DE 10217200 Al, Search Report dated Jan. 17, 2014.
International Search Report PCT/EP2014/053389; Filing Date: Feb. 21, 2014; 2 pgs.
Non-English European Exam Report for Application No. 14 707 705.1 dated Nov. 8, 2018.

* cited by examiner

OSCILLATING WELDING METHOD

CROSS-REFERENCE TO RELATED APPLICATIONS

This application claims priority to PCT Application No. PCT/EP2014/053389, having a filing date of Feb. 21, 2014, based off of DE Application No. 102014200834.4 having a filing date of Jan. 17, 2014, the entire contents of which are hereby incorporated by reference.

FIELD OF TECHNOLOGY

The following relates to a welding method in which the welding beam is moved in oscillation.

BACKGROUND

During the laser deposition welding of nickel-based superalloys having a high proportion of metallic phase γ', hot cracks can already form during solidification of the melt. By reducing the beam diameter of the laser with a circular intensity distribution, smaller grains are achieved and solidification cracks can be avoided, but this reduces the rate of deposition of the material.

SUMMARY

An aspect relates to a welding method which makes it possible to achieve small grains and high deposition rates.

An oscillating motion in the horizontal direction should cause the solidification front to change constantly so as to produce an oscillating solidification form. As a result of a constantly changing solidification function, the grain growth is interrupted during the solidification of the melt and the microstructure solidifies in fine-grained form. The fine-grained quality of the microstructure causes the welding residual stresses which thus remain to be distributed over the grain boundaries so as to avoid cracks in the weld seam or in the weld metal.

The welding method can be remelting or deposition welding. Both methods produce a melt and a solidification front.

BRIEF DESCRIPTION

Some of the embodiments will be described in detail, with reference to the following figures, wherein like designations denote like members, wherein.

DETAILED DESCRIPTION

The figures and the description represent only exemplary embodiments of the invention.

Figure 1:
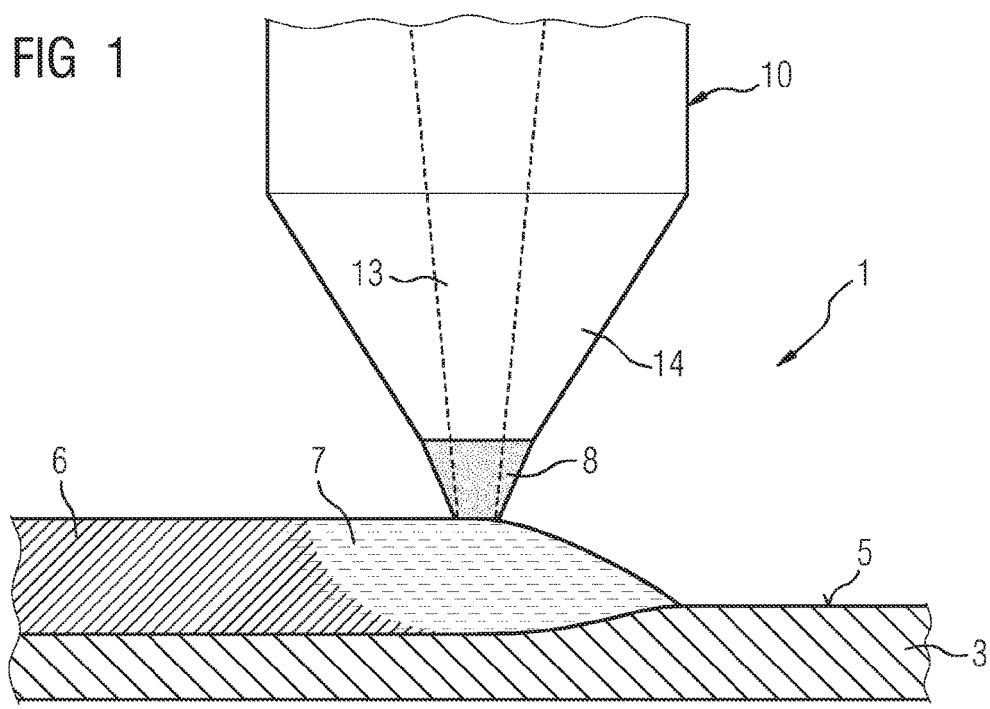
FIG. 1 shows an arrangement for welding.

FIG. 1 shows a device 1 for a welding method, in particular a laser welding method, on the basis of which embodiments of the invention will be explained in a non-limiting manner.

The method is thus not limited to laser welding methods, but is also applicable for electron beam welding methods and other plasma welding methods with corresponding energy sources.

Material 8 is deposited onto a substrate 3, which, in the case of turbine blades or vanes, is a nickel-based or cobalt-based superalloy having a high γ' proportion and therefore generally an alloy having poor weldability.

A welding bead 6, as part of the deposition weld, has already been generated.

In the case of a remelt method, the welding bead is the remelted region.

At those points where a laser, as an exemplary energy source 13, directs the laser beams 15 (FIG. 2) thereof onto the substrate 3, there is a melt pool 7.

A powder nozzle, as the material feed 14, preferably feeds powder 8, with the powder 8 being melted, in this case by laser radiation 15. The material 8 is fed in the form of powder, but may also be fed as a wire. This laser radiation 15 is in particular pulsed.

The area to be welded is made up of a plurality of welding beads lying next to one another and if appropriate one above another and preferably has, in at least one direction, a length of greater than or equal to 4 mm.

Figure 2:
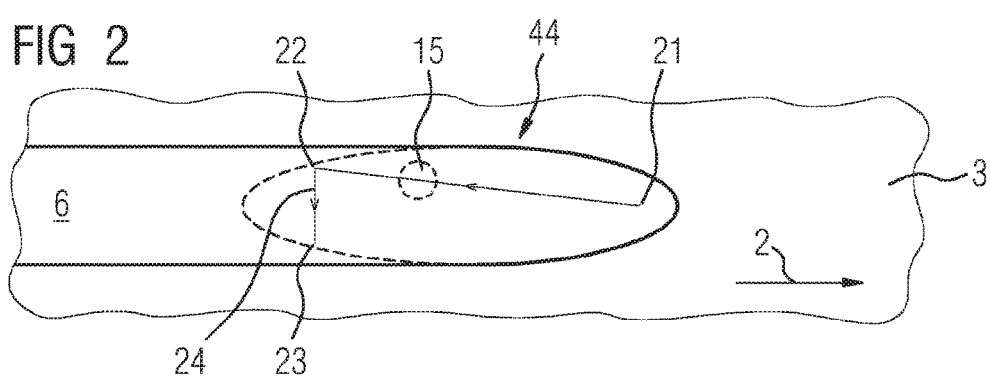
FIGS. 2-4 show the sequence of the oscillating motion.
Figure 3:
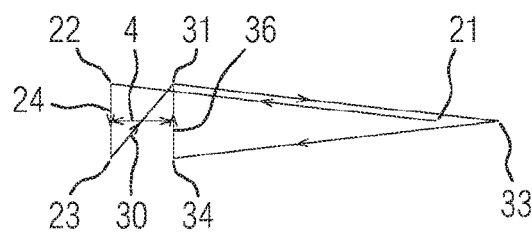
Figure 4:
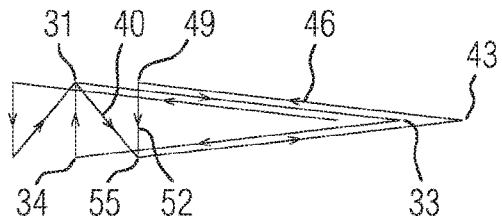

FIGS. 2, 3 and 4 show the for example triangular 44; 31, 34; 43, 49, 55 oscillating motion of the laser radiation 15.

The oscillating motion is preferably affected only in one plane.

The triangular shape 44; 31, 34; 43, 49, 55 is preferably an acute-angled triangle, with a height (in the direction of movement 2) of the triangular shape 44 preferably being at least twice the magnitude of the base 24.

An oscillating motion preferably proceeds as follows:
From a first starting point 21 (FIG. 2), the laser radiation 15 moves counter to the direction of movement 2 at an angle with respect to the direction of movement 2 as far as a first deflection point 22, where the laser radiation 15 is then moved perpendicularly with respect to the direction of movement 2 in a direction 24 as far as a second deflection point 23.

In order that the laser radiation 15 continues to move along as a whole in the direction of movement 2, it then moves obliquely with respect to the direction of movement 2 in the direction of movement 2 in a first oblique direction 30 (FIG. 3) to a second starting point 31, which lies downstream of the first deflection point 22 in the direction of movement 2. The second starting point 31 is level with the first deflection point 22, displaced by a distance 4.

From there, the laser radiation 15 then moves forward again as far as a third deflection point 33. The third deflection point 33 lies downstream of the first starting point 21 in the direction of movement 2. A connecting line between points 21, 33 is parallel to the direction of movement 2. From there, the laser radiation 15 oscillates again at an angle with respect to the direction of movement 2 counter to the direction of movement 2 as far as a fourth deflection point 34.

The fourth deflection point 34 is level with the second starting point 31 in a perpendicular direction with respect to the direction of movement 2 and level with the second deflection point 23 in the direction of movement 2.

In a second perpendicular direction of movement 36 which is perpendicular with respect to the direction of movement 2, the laser radiation 15 moves back to the second starting point 31 of the triangular oscillating motion (FIG. 3).

The further triangular oscillating motion proceeding from FIG. 3 can then be identified in FIG. 4, in which the laser radiation 15 oscillates in a second oblique direction 40 with respect to the direction of movement 2 in the direction of movement 2 to the seventh deflection point 55. The seventh deflection point 55 is level with the point 34. From there, the laser radiation 15 then moves in the direction of the third deflection point 33 to a fifth deflection point 43, which lies downstream of the deflection point 33 as shown in FIG. 3.

From the fifth deflection point 43, the laser radiation 15 moves obliquely with respect to the direction of movement 2 counter to the direction of movement 2 in a third rearward motion 46 as far as a sixth deflection point 49. From the sixth deflection point 49, the laser radiation 15 oscillates perpendicularly with respect to the direction of movement 2 to the seventh deflection point 55.

Effectively, a triangular shape is always displaced in the direction of movement 2 for the course of the laser radiation 15, such that the triangular shapes overlap.

This represents only one procedure for the preferably triangular oscillation.

On account of embodiments of the invention, this procedure achieves improved material properties.

Although the present embodiments of has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method for welding a substrate, comprising the following step:
   providing an energy source and a material feed;
   moving at least one of the energy source and the material feed in an oscillating motion with respect to a surface of the substrate, wherein the oscillating motion occurs at least once at least partially in a triangular shape with respect to the surface; and
   emitting energy and material with respect to the surface of a substrate, during the oscillating motion, thereby producing a weld on the surface of the substrate.

2. The method as claimed in claim 1, in which remelt welding takes place.

3. The method as claimed in claim 1, in which deposition welding takes place.

4. The method as claimed in claim 1, in which the energy source is moved in an oscillating motion at least once in a triangular shape with respect to the surface.

5. The method as claimed in claim 1, in which the energy source and the material feed are moved in an oscillating motion at least once at least partially in a triangular shape with respect to the surface.

6. The method as claimed in claim 1, in which the energy source and the material feed are moved in an oscillating motion at least once in a triangular shape with respect to the surface.

7. The method as claimed in claim 1, in which laser radiation is used as the energy source.

8. The method as claimed in claim 1, in which powder is fed via the material feed.

9. The method as claimed in claim 1, in which nickel-based or cobalt-based superalloys are used as the substrate.

10. The method as claimed in claim 1, in which use is made of a welding nozzle, which has the material feed wherein the material feed is a powder feed, and generation and supply of the energy wherein the energy is laser radiation.

11. The method as claimed in claim 1, in which the oscillating deflection is up to 2 mm.

12. The method as claimed in claim 1, in which the welded area is ≥4 mm in at least one orientation.

13. The method as claimed in claim 1, in which the energy source and/or material feed are moved repeatedly perpendicularly, with respect to the direction of movement.

14. The method as claimed in claim 1, in which the oscillating motion is effected only two-dimensionally.

* * * * *